Oct. 14, 1958
J. J. KUESER
2,856,508
COOKER WITH REMOVABLE CONTROL
Filed March 21, 1955
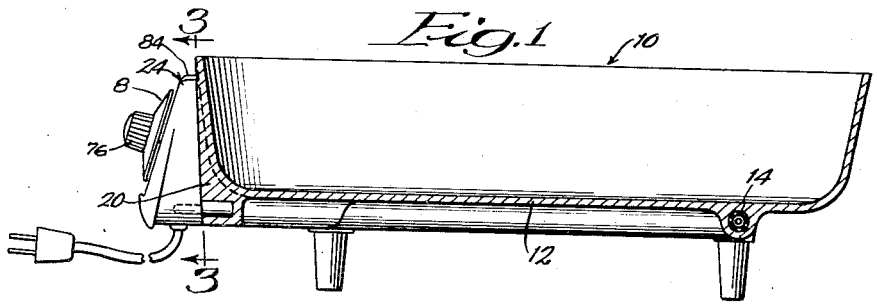
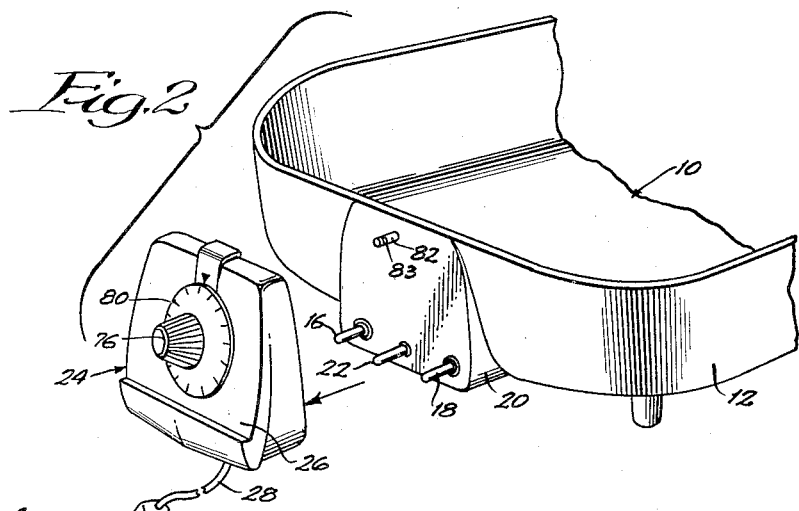
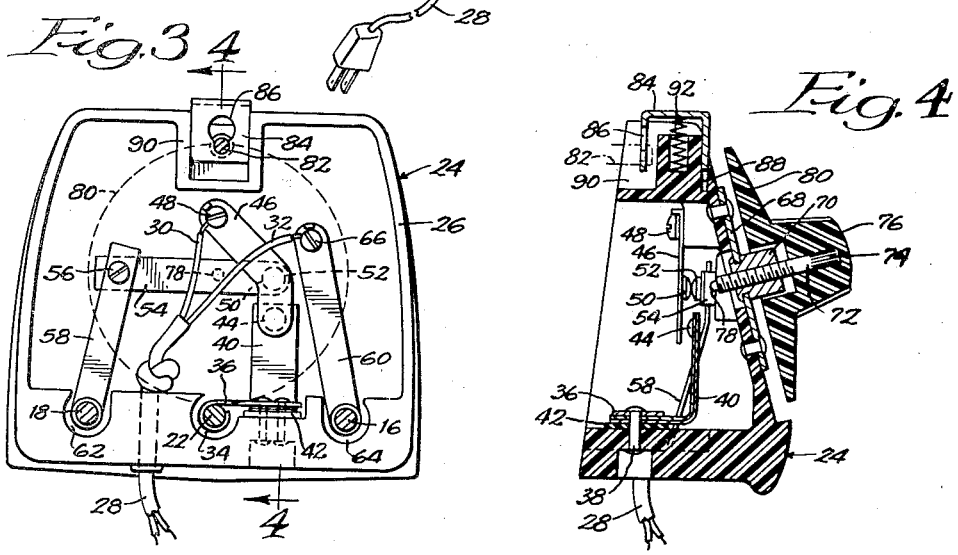
INVENTOR:
John J. Kueser,
BY
Bair, Freeman & Molinare
ATTORNEYS.

United States Patent Office 2,856,508
Patented Oct. 14, 1958

2,856,508

COOKER WITH REMOVABLE CONTROL

John J. Kueser, St. Louis, Mo., assignor to Knapp-Monarch Company, St. Louis, Mo., a corporation of Delaware Application March 21, 1955, Serial No. 495,450

2 Claims. (Cl. 219—44)

This invention relates generally to an electrical cooking appliance, and more particularly to an electrical cooker having thermostatic control means.

The numerous conveniences afforded by electrical household appliances which permit table-top cooking in the home have resulted in a growing need for efficient multi-purpose cooking devices capable of simple and efficient operation. It has been desirable, therefore, to provide electrical cooking appliances of the pan or cooker type with thermostatic control means to permit greater cooking versatility. The provision of such control devices has necessitated the use of costly mounting constructions affording water-tight enclosure of the various electrical component parts to permit the appliance to be thoroughly cleaned between uses.

It is a primary object of this invention, therefore, to provide a multi-purpose cooking appliance having a detachably removable thermostatic control unit of simple and low cost construction, whereby the cooking container may be readily cleaned by immersion washing separate and apart from the electrical components of the control unit.

It is another object of this invention to provide a thermostatic control unit for an electrical cooking appliance which is adapted to be operatively and removably coupled to a separate cooker unit exteriorly thereof in heat conducting contact with the cooking pan and in electrical conducting relation with the heating element thereof.

It is a further object to provide a removably detachable thermostatic control unit of simple, efficient, and low cost construction.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a side elevational view in vertical cross section of an electrical cooking appliance constructed in accordance with the present invention;

Figure 2 is a perspective view, partly broken away, showing the cooker unit and control unit of the appliance of Figure 1 in separated relation;

Figure 3 is an elevational view of the control unit looking toward the face thereof adapted to be disposed in coupled adjacent relation to the cooker unit; and Figure 4 is a vertical cross-sectional view taken substantially as indicated by the line 4—4 on Figure 3.

Referring now more particularly to Figure 1 of the drawing, I have shown a multi-purpose electrical cooking appliance embodying the present invention, and comprising a cooker unit 10 providing an upwardly open cooking container or pan 12. The pan 12 is preferably formed from cast aluminum, and integrally encloses a heating element 14 preferably of the tubular metal-sheathed type. The heating element 14 is of generally U-shape in plan form, and provides a pair of electrical terminals 16 and 18 extending outwardly through an enlargement or boss at the forward end of the pan 12 (see Figure 2).

The terminals 16 and 18 are spaced from each other, and are completely sealed relative to the pan 12 at their points of emergence from the boss 20. In practice, the heating element and its terminals are integrally cast with the pan at the time of its formation, thereby providing a unitary sealed structure. In this way, the terminals are completely waterproof relative to the tubular body of the heating element so that the entire cooker unit may be thoroughly washed without any hazard of water seepage into the heating element.

Although the integrally embedded heating element construction illustrated in the drawing is preferred, it will be understood that alternative constructions employing an externally mounted heating element are equally adaptable to the present invention. For example, a self-contained heating element may be fitted into place within an open channel formed in the pan, and crimped or otherwise fixed in assembled relation. Such an alternative pan and heating element assembly is adaptable to immersion washing in that the self-contained heating element is itself impervious to injury by contact with water.

A heat conductor pin 22 is disposed between the spaced electrical terminals 16 and 18 in outwardly extending relation from the boss 20. The pin 22 provides a heat conducting coupling for the cooking pan 12.

A control unit 24 is provided for attachment to the cooker unit 10. The control unit 24 provides manually adjustable thermostatic regulating means for controlling the cooking temperature of the cooker unit as desired. The control unit 24 comprises a hollow body 26 which is preferably molded from a high temperature resistant plastic material to afford a light, low cost, and electrically insulating housing. An electrical cord 28 having a suitable plug for connection to a current supply passes through the body 26 and terminates interiorly thereof in a pair of insulated lead wires 30 and 32. The cord 28 is suitably knotted (see Figure 3) or otherwise secured within the body 26 to prevent accidental removal of the cord 28.

The body 26 is formed with an open-ended recess or bore 34 adapted to receive the heat conductor pin 22 when the control unit 24 is attached to the cooker unit 10. A heat conductor spring 36 is fixedly carried by a base portion of the body 26 by suitable attaching means such as rivets 38. The spring 36 provides a coil portion of proper size and resilience for receiving the pin 22 therein in heat conducting relation.

One leg of a bimetal element 40 of generally L-shape is positioned between the mounting portion of the heat conductor spring 36 and an insulator plate 42, forming a pack assembly rigidly secured to the body 26 by the rivets 38. The other leg of the bimetal 40 extends upwardly and carries an insulating nib 44 adjacent its upper end for mechanical cooperation with the free lower end of a thermostat spring blade 46. The upper end of the blade 46 is adapted to be secured by means of a mounting bolt 48 to a suitable internal boss of the body 26. The mounting bolt 48 also serves as a terminal connecting screw for the bare end of the lead wire 30 (see Figure 3).

The blade 46 carries an electrical contact 50 intermediate its ends. The contact 50 cooperates with a second electrical contact 52 carried by the free end of an adjustable spring blade 54. The other end of the blade 54 is fixedly mounted by means of a bolt 56 to a suitable internal boss of the body 26.

A pair of terminal spring blades 58 and 60 are disposed within the body 26 with their lower free ends extending into a pair of open-ended recesses or bores 62 and 64 adapted to receive the terminals 16 and 18 therein when the control unit 24 is attached to the cooker unit 10. The upper end of blade 58 is fixedly secured to the body 26 by the bolt 56 in electrical contacting engagement with the blade 54. The upper end of the blade 60 is secured by means of a bolt 66 to a suitable internal boss of the body 26. The bolt 66 also provides a terminal connecting screw for the bare end of lead wire 32 (see Figure 3).

The blades 58 and 60 are angularly bent toward the cooker unit intermediate their lengths (see blade 58 in Figure 4) to provide a suitable spring resilience at their lower free ends within the recesses 62 and 64. Full entry of the terminals 16 and 18 into the recesses 62 and 64 results in a bending of the blades 58 and 60 against their spring bias, thereby maintaining electrical contacting engagement therewith.

The outer face of the body 26 provides a fixedly secured mounting plate 68 carrying a bushing 70 which extends through a suitable aperture in the body into the hollow interior thereof. A screw-threaded adjusting pin 72 extends through a cooperatively threaded bore in the bushing 70. The outer end of the adjusting pin 72 is splined at 74 for tight frictional engagement and support of a control knob 76. The inner end of the pin 72 provides an insulated nib 78 adapted to effect contacting engagement with the adjustable spring blade 54. The control knob 76 provides a peripheral flange 80 having suitable temperature indicia thereon. In this way, rotation of the control knob 76 will serve to extend and withdraw the adjusting pin 72 relative to the blade 54, and the position thereof will be marked by the indicia of flange 80.

A latch pin 82 extends outwardly from the body 20 of the pan 12, and provides an annular groove 83 adjacent its outer end. The pin 82 cooperates with a locking and releasing latch 84 of generally U-shape carried by the body 26. One arm of the latch 84 is apertured at 86 to receive the pin 82 therethrough. The other arm of the latch 84 is vertically slidable within a suitable slot 88 formed by the body 26. Additional portions 90 of the body 26 define guide surfaces and a recess for the latch 84. A spring 92 serves to bias the latch 84 in an upward direction. In this way, the control unit 24 may be releasably locked in attached position on the cooker unit 10 by manually depressing the latch 84 to permit entry or removal of the pin 82. It will be apparent that the lower edge of the aperture 86 will effect locking engagement with the groove of pin 82 by means of the force exerted by spring 92.

In practical operation, with the control unit 24 attached to the cooker unit 10, and the electrical cord 28 plugged into a suitable current supply, electrical energy will be transmitted to the heating element 14 through an electrical circuit completed by the conducting elements 30, 46, 50, 52, 54, 58, 18, heating element 14, and conducting elements 16, 60, and 32. As the temperature of the pan rises, heat will be conducted by the pin 22 and spring 36 to the bimetal element 40. The upright leg of the bimetal 40 is adapted to deflect toward the left (as seen in Figure 4) with increasing temperature. The insulating nib 44 engages and moves the thermostat spring blade 46 when a predetermined high temperature is reached, effecting separation of the contacts 50 and 52 and de-energizing the heating element 14.

In this way, the electrical circuit for energizing the heating element 14 will be opened and closed in accordance with the temperature of the cooking pan 12. The control knob 76 permits manual adjustment, by means of the insulated nib 78 of adjusting screw 72, of the position of the contact 52 of blade 54 relative to the contact 50 of blade 46. In practice, a dial range of about 200° to 450° F. is marked by the indicia on control knob flange 80. A suitable indicator marking either on the latch 84 or the body 26 is provided for cooperation with the indicia to indicate the position of control adjustment. Any predetermined temperature setting of the control knob 76 serves to adjust the position of the normally engaged contacts 50 and 52 relative to the insulating nib 44 of bimetal 40, thereby varying the distance through which the bimetal 40 must bend before effecting a breaking of contact.

By the present invention I have provided an extremely simple, efficient, and reliable thermostatic control structure capable of low cost construction. The control unit may be detachably secured to the cooker unit for cooking operation, and may be readily removed to permit immersion washing of the cooker unit without any risk of introducing water and consequent short-circuiting hazards either to the control unit or the cooker heating element.

Changes may be made in the construction and arrangement of the parts of my cooker with removable control without departing from the real spirit and purpose of my invention, and it is my intention to cover by the claims any modified forms of structure or use of mechanical improvements which may be reasonably included within their scope.

What I claim as new and desire to obtain by Letters Patent of the United States is:

1. An electrical cooking appliance comprising a cooking pan having a heating element in sealed relation therein, a pair of electrical terminals extending from the ends of said heating element outwardly through said pan, said terminals being in water-tight sealed relation with respect to said pan, a heat conductor pin secured to said pan in heat conducting relation and extending outwardly therefrom closely adjacent said terminals, a thermostatic control unit adapted to receive said terminals and conductor pin whereby said control unit and cooking pan may be operatively coupled together in heat and electrical conducting relation, said control unit having a pair of electrical contacts adapted to engage said terminals and to be coupled to a current supply for completing an electrical circuit through said pan heating element, and thermostatically adjustable means within said control unit operative to open and close said current supply circuit substantially in response to the temperature of said cooking pan, said last named means comprising a heat conductor spring slidably receiving and contactingly engaging said conductor pin, a bimetal element in heat conducting contact with said spring, and a pair of normally engaged electrical contacts in said current supply circuit, said bimetal element when deflected at high temperature serving to separate said contacts, and manual adjusting means for varying the position of said contacts relative to said bimetal element to permit selection of a predetermined high temperature for circuit opening, whereby a substantially constant predetermined cooking temperature is maintained.

2. An electrical cooking appliance comprising a cooking pan having a heating element in sealed relation therein, a pair of electrical terminals extending from the ends of said heating element outwardly through said pan, said terminals being in water-tight sealed relation with respect to said pan, a heat conductor pin having its one end embedded within said pan in water-tight sealed relation and integral heat conducting relation therewith and having its other end freely extending outwardly therefrom closely adjacent said terminals, a detachably removable thermostatic control unit adapted to receive said terminals and conductor pin whereby said control unit and cooking pan may be operatively coupled together in heat and electrical conducting relation, said control unit having a pair of electrical contacts adapted to engage said terminals and to be coupled to a current supply for completing an electrical circuit through said pan heating element, and thermostatically adjustable means within said control unit having resilient heat conducting means slidably receiving said heat conductor pin in heat conducting relation and being operative to open and close said current supply circuit substantially in response to the temperature of said cooking pan for maintaining a substantially constant predetermined cooking temperature.

References Cited in the file of this patent

UNITED STATES PATENTS

| | | |
|---|---|---|
| 1,431,542 | Ross | Oct. 10, 1922 |
| 1,710,955 | Offord | Apr. 30, 1929 |
| 1,780,631 | Peterson | Nov. 4, 1930 |
| 1,857,906 | Wolcott | May 10, 1932 |
| 2,164,813 | Gunther | July 4, 1939 |
| 2,407,764 | Oebbecke | Sept. 17, 1946 |
| 2,744,995 | Jepson | May 8, 1955 |

FOREIGN PATENTS

| | | |
|---|---|---|
| 245,614 | Switzerland | Aug. 1, 1947 |
| 725,341 | Great Britain | Mar. 2, 1955 |